US011515523B2

(12) United States Patent
Ha et al.

(10) Patent No.: US 11,515,523 B2
(45) Date of Patent: *Nov. 29, 2022

(54) RECHARGEABLE LITHIUM BATTERY

(71) Applicant: Samsung SDI Co., Ltd., Yongin-si (KR)

(72) Inventors: Jaehwan Ha, Yongin-si (KR); Kijun Kim, Yongin-si (KR); Heeeun Yoo, Yongin-si (KR); Yeonhee Yoon, Yongin-si (KR); Kyuseo Lee, Yongin-si (KR); Dongmyung Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 194 days.

This patent is subject to a terminal disclaimer.

(21) Appl. No.: 16/864,384

(22) Filed: May 1, 2020

(65) Prior Publication Data

US 2020/0350567 A1 Nov. 5, 2020

(30) Foreign Application Priority Data

May 3, 2019 (KR) ........................ 10-2019-0052572

(51) Int. Cl.
| *H01M 4/36* | (2006.01) |
| *H01M 4/38* | (2006.01) |
| *H01M 4/505* | (2010.01) |
| *H01M 4/525* | (2010.01) |
| *H01M 4/58* | (2010.01) |
| *H01M 4/62* | (2006.01) |
| *H01M 10/052* | (2010.01) |
| *H01M 4/02* | (2006.01) |

(52) U.S. Cl.
CPC ........... *H01M 4/364* (2013.01); *H01M 4/366* (2013.01); *H01M 4/382* (2013.01); *H01M 4/505* (2013.01); *H01M 4/525* (2013.01); *H01M 4/5825* (2013.01); *H01M 4/62* (2013.01); *H01M 10/052* (2013.01); *H01M 2004/021* (2013.01)

(58) Field of Classification Search
None
See application file for complete search history.

(56) References Cited

U.S. PATENT DOCUMENTS

| 5,582,931 A | 12/1996 | Kawakami |
| 6,391,495 B1 | 5/2002 | Choi et al. |
| 6,465,125 B1 | 10/2002 | Takami et al. |
| 6,475,678 B1 | 11/2002 | Suzuki |
| 6,511,517 B1 | 1/2003 | Ullrich et al. |
| 6,511,776 B1 | 1/2003 | Ryuji et al. |
| 10,476,082 B2 | 11/2019 | Jang et al. |
| 10,756,352 B2 | 8/2020 | Yoon et al. |
| 2001/0041289 A1 | 11/2001 | Hikmet et al. |
| 2002/0004169 A1 | 1/2002 | Yamada et al. |
| 2005/0079422 A1 | 4/2005 | Ko et al. |
| 2005/0221165 A1 | 10/2005 | Heenige et al. |
| 2005/0287442 A1 | 12/2005 | Kim et al. |
| 2006/0099495 A1 | 5/2006 | Suzuki et al. |
| 2007/0057228 A1 | 3/2007 | Huang et al. |
| 2007/0264577 A1 | 11/2007 | Katayama et al. |
| 2008/0241684 A1 | 10/2008 | Muraoka et al. |
| 2008/0292965 A1 | 11/2008 | Kubota et al. |
| 2009/0067119 A1 | 3/2009 | Katayama et al. |
| 2009/0253043 A1 | 10/2009 | Bak |
| 2010/0248026 A1 | 9/2010 | Hinoki et al. |
| 2010/0266905 A1 | 10/2010 | Jeon et al. |
| 2011/0003209 A1 | 1/2011 | Katayama et al. |
| 2011/0062378 A1 | 3/2011 | Chang et al. |
| 2012/0321948 A1 | 12/2012 | Oya et al. |
| 2013/0011747 A1 | 1/2013 | Sasaki et al. |
| 2013/0089794 A1 | 4/2013 | Kim |
| 2013/0236790 A1 | 9/2013 | Byun |
| 2014/0014027 A1* | 1/2014 | Bischoff ................. G09F 11/04 116/309 |
| 2014/0272489 A1 | 9/2014 | Anandan et al. |

(Continued)

FOREIGN PATENT DOCUMENTS

| CN | 1246736 | 3/2000 |
| CN | 1286507 | 3/2001 |

(Continued)

OTHER PUBLICATIONS

Machine translation of JP2018-106879, published on Jul. 5, 2018 (Year: 2018).*
Office Action dated Mar. 4, 2021, issued to U.S. Appl. No. 16/460,765.
Extended European Search Report dated Oct. 19, 2020, issued to European Patent Application No. 20172161.
Office Action and Search Report dated Feb. 9, 2022, issued to Chinese Patent Application No. 201910594666.
Office Action dated Feb. 17, 2022, issued to U.S. Appl. No. 16/862,779.

(Continued)

*Primary Examiner* — Anca Eoff
(74) *Attorney, Agent, or Firm* — H.C. Park & Associates, PLC

(57) ABSTRACT

A rechargeable lithium battery includes a positive electrode having a positive current collector and a positive active material layer at least partially disposed on the positive current collector, wherein the positive active material layer includes a first positive active material having at least one of a composite oxide of a metal selected from cobalt, manganese, nickel, and a combination thereof and lithium, and a second positive active material having a compound represented by Chemical Formula 1 as defined herein, and a negative electrode having a negative current collector, a negative active material layer at least partially disposed on the negative current collector, and a negative electrode functional layer having generally flake-shaped polyethylene particles at least partially disposed on the negative active material layer.

17 Claims, 6 Drawing Sheets

(56) References Cited

U.S. PATENT DOCUMENTS

| | | | |
|---|---|---|---|
| 2014/0322600 A1 | 10/2014 | Morita et al. | |
| 2015/0050533 A1 | 2/2015 | Nam et al. | |
| 2015/0221452 A1 | 8/2015 | Iida et al. | |
| 2016/0104880 A1 | 4/2016 | Gao et al. | |
| 2016/0141579 A1 | 5/2016 | Seok et al. | |
| 2016/0268558 A1 | 9/2016 | Sawayama et al. | |
| 2016/0285101 A1 | 9/2016 | Yoshio et al. | |
| 2016/0322636 A1 | 11/2016 | Lee et al. | |
| 2016/0351885 A1 | 12/2016 | Umehara | |
| 2017/0187022 A1 | 6/2017 | Isozaki et al. | |
| 2017/0229731 A1 | 8/2017 | Visco et al. | |
| 2017/0288257 A1 | 10/2017 | Kil et al. | |
| 2018/0040899 A1 | 2/2018 | Kuzuoka et al. | |
| 2018/0083312 A1 | 3/2018 | Shiu et al. | |
| 2018/0097218 A1 | 4/2018 | Komura | |
| 2018/0145333 A1 | 5/2018 | Tokune et al. | |
| 2018/0191027 A1 | 7/2018 | Ohara et al. | |
| 2018/0294516 A1 | 10/2018 | Huang et al. | |
| 2018/0331342 A1 | 11/2018 | Honda et al. | |
| 2018/0375158 A1 | 12/2018 | Morinaka et al. | |
| 2019/0123356 A1 | 4/2019 | Ko et al. | |
| 2019/0140283 A1 | 5/2019 | Fukatani et al. | |
| 2019/0229325 A1 | 7/2019 | Ahn et al. | |
| 2019/0334157 A1 | 10/2019 | Seok et al. | |
| 2019/0355952 A1 | 11/2019 | Yoon et al. | |
| 2019/0383465 A1 | 12/2019 | Van Der et al. | |
| 2020/0014027 A1 | 1/2020 | Ha et al. | |
| 2020/0014078 A1 | 1/2020 | Ha et al. | |
| 2020/0075955 A1 | 3/2020 | Jeon et al. | |
| 2020/0127257 A1 | 4/2020 | Lee et al. | |
| 2020/0194784 A1 | 6/2020 | Lee et al. | |
| 2020/0350557 A1 | 11/2020 | Ha et al. | |
| 2020/0350566 A1 | 11/2020 | Ha et al. | |
| 2020/0350567 A1 | 11/2020 | Ha et al. | |
| 2020/0350568 A1 | 11/2020 | Lee et al. | |
| 2020/0350574 A1 | 11/2020 | Ha et al. | |
| 2020/0350580 A1 | 11/2020 | Ha et al. | |
| 2020/0350632 A1 | 11/2020 | Ha et al. | |
| 2021/0074967 A1* | 3/2021 | Kim | H01M 4/622 |
| 2021/0074971 A1* | 3/2021 | Kim | H01M 50/367 |
| 2021/0074972 A1* | 3/2021 | Kim | H01M 4/62 |
| 2021/0074975 A1* | 3/2021 | Kwak | H01M 10/613 |
| 2021/0074979 A1* | 3/2021 | Kwak | H01M 50/3425 |
| 2021/0074980 A1* | 3/2021 | Kim | H01M 4/525 |

FOREIGN PATENT DOCUMENTS

| | | |
|---|---|---|
| CN | 101048892 | 10/2007 |
| CN | 101783417 | 7/2010 |
| CN | 101847709 | 9/2010 |
| CN | 101478042 | 12/2010 |
| CN | 102280614 | 12/2011 |
| CN | 104393267 | 3/2015 |
| CN | 104466186 | 3/2015 |
| CN | 105977447 | 9/2016 |
| CN | 106848383 | 6/2017 |
| CN | 111883815 | 11/2020 |
| CN | 111883816 | 11/2020 |
| CN | 111883819 | 11/2020 |
| EP | 1079455 | 2/2001 |
| EP | 1826842 | 8/2007 |
| EP | 2581977 | 4/2013 |
| EP | 2838142 | 2/2015 |
| EP | 2874215 | 5/2015 |
| EP | 3024063 | 5/2016 |
| EP | 3386003 | 10/2018 |
| JP | 2000-277148 | 10/2000 |
| JP | 2001-135359 | 5/2001 |
| JP | 2004-111157 | 4/2004 |
| JP | 2005-123185 | 5/2005 |
| JP | 2008-305783 | 12/2008 |
| JP | 4977079 | 7/2012 |
| JP | 2012-221672 | 11/2012 |
| JP | 2015-115168 | 6/2015 |
| JP | 6197384 | 9/2017 |
| JP | 6271709 | 1/2018 |
| JP | 2018-106879 | 7/2018 |
| JP | 2018-147672 | 9/2018 |
| JP | 2018-156876 | 10/2018 |
| JP | 2018156876 | 10/2018 |
| JP | 2019-087464 | 6/2019 |
| KR | 10-2000-0056339 | 9/2000 |
| KR | 10-2005-0035074 | 4/2005 |
| KR | 10-2005-0035281 | 4/2005 |
| KR | 10-2005-0121172 | 12/2005 |
| KR | 10-2008-0073371 | 8/2008 |
| KR | 10-1205375 | 3/2009 |
| KR | 10-2009-0106841 | 10/2009 |
| KR | 10-2010-0081950 | 7/2010 |
| KR | 10-2013-0104088 | 9/2013 |
| KR | 10-2013-0105449 | 9/2013 |
| KR | 10-2015-0020022 | 2/2015 |
| KR | 10-2015-0050974 | 5/2015 |
| KR | 10-2015-0129181 | 11/2015 |
| KR | 10-2015-0143334 | 12/2015 |
| KR | 10-2016-0024776 | 3/2016 |
| KR | 10-2016-0025052 | 3/2016 |
| KR | 10-2016-0029176 | 3/2016 |
| KR | 10-2016-0066518 | 6/2016 |
| KR | 10-2016-0110076 | 9/2016 |
| KR | 10-2016-0117689 | 10/2016 |
| KR | 10-2017-0060515 | 6/2017 |
| KR | 10-2017-0094720 | 8/2017 |
| KR | 10-2017-0109285 | 9/2017 |
| KR | 10-2017-0113645 | 10/2017 |
| KR | 10-2018-0014192 | 2/2018 |
| KR | 10-2018-0037121 | 4/2018 |
| KR | 10-2018-0045724 | 5/2018 |
| KR | 10-2018-0049986 | 5/2018 |
| KR | 10-2018-0077190 | 7/2018 |
| KR | 10-2018-0081072 | 7/2018 |
| KR | 10-1876826 | 7/2018 |
| KR | 10-2018-0097036 | 8/2018 |
| KR | 10-2019-0043955 | 4/2019 |
| KR | 10-2020-0004099 | 1/2020 |
| KR | 10-2020-0044579 | 4/2020 |
| WO | 2006-132474 | 12/2006 |
| WO | 2011115247 | 7/2013 |
| WO | 2014-103792 | 7/2014 |
| WO | 2018-012821 | 1/2018 |

OTHER PUBLICATIONS

Office Action dated Feb. 17, 2022, issued to U.S. Appl. No. 16/460,765.

Final Office Action dated Oct. 22, 2021, issued to U.S. Appl. No. 16/460,779.

Advisory Action dated Nov. 17, 2021, issued to U.S. Appl. No. 16/460,765.

Extended European Search Report dated Nov. 7, 2019 to European Patent Application No. 19183919.0.

Extended European Search Report dated Nov. 7, 2019 to European Patent Application No. 19183958.8.

Extended European Search Report dated Aug. 3, 2020, issued to European Patent Application No. 20171859.0.

Extended European Search Report dated Aug. 3, 2020, issued to European Patent Application No. 20171551.3.

Extended European Search Report dated Aug. 3, 2020, issued to European Patent Application No. 20171450.8.

Extended European Search Report dated Aug. 3, 2020, issued to European Patent Application No. 20171833.5.

Extended European Search Report dated Aug. 3, 2020, issued to European Patent Application No. 20171846.7.

Extended European Search Report dated Aug. 3, 2020, issued to European Patent Application No. 20172132.1.

Office Action dated Nov. 9, 2021, issued to European Patent Application No. 19183919.0.

Notice of Refusal dated Mar. 11, 2021, issued to Korean Patent Application No. 10-2018-0160080.

Grant of Patent dated Mar. 25, 2021, issued to Korean Patent Application No. 10-2018-0077138.

(56) References Cited

OTHER PUBLICATIONS

Grant of Patent dated Mar. 25, 2021, issued to Korean Patent Application No. 10-2018-0077139.
Office Action dated Apr. 12, 2021, issued to U.S. Appl. No. 16/460,779.
Advisory Action and AFCP Decision dated Jan. 6, 2022 issued to U.S. Appl. No. 16/460,779.
Office Action dated Jan. 26, 2022 and Search Reported dated Jan. 21, 2022, issued to Chinese Patent Application No. 201901595050.
Notice of Allowance dated Sep. 2, 2021, issued to Korean Patent Application No. 10-2018-0160080.
Office Action dated Sep. 10, 2021, issued to U.S. Appl. No. 16/460,765.
Office Action dated Sep. 10, 2021, issued to U.S. Appl. No. 16/711,114.
Non-Final Office Action dated Jun. 28, 2022, issued to U.S. Appl. No. 16/864,858.
Non-Final Office Action dated Apr. 27, 2022, issued to U.S. Appl. No. 16/862,638.
Non-Final Office Action dated Mar. 28, 2022, issued to U.S. Appl. No. 16/863,679.
Final Office Action dated Dec. 15, 2021, issued to U.S. Appl. No. 16/711,114.
Notice of Allowance dated Mar. 2, 2022, issued to U.S. Appl. No. 16/711,114.
Non-Final Office Action dated May 3, 2022, issued to U.S. Appl. No. 16/864,294.
Non-Final Office Action dated May 12, 2022, issued to U.S. Appl. No. 16/862,866.
Final Office Action dated Jun. 7, 2022, issued to U.S. Appl. No. 16/862,779.
Notice of Allowance dated Aug. 8, 2022, of U.S. Appl. No. 16/862,638.
Office Action dated Aug. 23, 2022, of Chinese.Patent Application No. 201911266005.8.
Final Office Action dated Aug. 30, 2022, issued to U.S. Appl. No. 16/864,294.
Notice of Allowance dated Aug. 15, 2022, issued to U.S. Appl. No. 16/862,77.
Final Office Action dated Sep. 23, 2022, issued to U.S. Appl. No. 16/460,765.
Notice of Allowance dated Oct. 5, 2022, issued to Korean Patent Application No. 10-2019-0052569.
Notice of Allowance dated Oct. 5, 2022, issued to Korean Patent Application No. 10-2019-0052568.

\* cited by examiner

RECHARGEABLE LITHIUM BATTERY

CROSS-REFERENCE TO RELATED APPLICATION

This application claims priority from and the benefit of Korean Patent Application No. 10-2019-0052572 filed on May 3, 2019, which is hereby incorporated by reference for all purposes as if fully set forth herein.

BACKGROUND

Field

Exemplary implementations of the invention relate generally to a rechargeable lithium battery.

Discussion of the Background

A portable information device such as a cell phone, a laptop, a smart phone, and the like or an electric vehicle has used a rechargeable lithium battery having high energy density and easy portability as a driving power source. In addition, active research is ongoing for the use of a rechargeable lithium battery as a power source for a hybrid or an electric vehicle or power storage by using high energy density characteristics.

One of the main research tasks of such a rechargeable lithium battery is to improve the safety of the rechargeable battery. For example, if the rechargeable lithium battery is exothermic due to an internal short circuit, overcharge and over discharge, and the like, and an electrolyte decomposition reaction and thermal runaway phenomenon occur, the internal pressure inside the battery may rise rapidly, which can cause a battery explosion. Among these conditions, when an internal short circuit of the rechargeable lithium battery occurs, there is a high risk of explosion because the high electrical energy stored in each electrode is conducted in the shorted positive electrode and negative electrode.

In addition to destroying the rechargeable lithium battery, the explosion may cause fatal damage to the user. Therefore, it is urgent to develop a technique capable of improving safety of the rechargeable lithium battery.

While lithium iron phosphate (LFP) has been used as a low heat-generating safety material, the average potential thereof is relatively low, accompanied by a decrease in capacity when discharging. Therefore, there is a need for technology development to improve these problems.

The above information disclosed in this Background section is only for understanding of the background of the inventive concepts, and, therefore, it may contain information that does not constitute prior art.

SUMMARY OF THE INVENTION

Rechargeable lithium batteries including a positive electrode constructed according to the principles and exemplary implementations of the invention exhibit a high capacity, a high voltage, and improved safety with respect to thermal and physical impact. Thus, some exemplary embodiments can provide a rechargeable lithium battery having high stability while maintaining high capacity under a high voltage.

Additional features of the inventive concepts will be set forth in the description which follows, and in part will be apparent from the description, or may be learned by practice of the inventive concepts.

According to one aspect of the invention, a rechargeable lithium battery, includes a positive electrode having a positive current collector and a positive active material layer at least partially disposed on the positive current collector, wherein the positive active material layer includes a first positive active material having at least one of a composite oxide of a metal selected from cobalt, manganese, nickel, and a combination thereof and lithium, and a second positive active material having a compound represented by Chemical Formula 1:

$$Li_aM_xFe_{1-x}PO_4 \qquad \text{Chemical Formula 1}$$

wherein, in Chemical Formula 1, $0.90 \leq a \leq 1.8$, $0.5 \leq x \leq 1.0$, and M is Mn, Co, Ni, or combination thereof; and a negative electrode having a negative current collector, a negative active material layer at least partially disposed on the negative current collector, and a negative electrode functional layer having generally flake-shaped polyethylene particles at least partially disposed on the negative active material layer.

The second positive active material may have an average potential of about 3.5 V to about 4.5 V.

The first positive active material and the second positive active material may have a weight ratio of about 97:3 to about 80:20.

The first positive active material may be provided in an amount of about 70 wt % to about 99 wt % based on a total weight of the positive active material layer.

The second positive active material may be provided in an amount of about 1 wt % to about 15 wt % based on a total weight of the positive active material layer.

The positive electrode may further include a positive electrode functional layer at least partially disposed on the positive active material layer.

The first positive active material may be included in the positive active material layer, and the second positive active material may be included in at least one of the positive active material layer and the positive electrode functional layer.

The first positive active material may include at least one of a lithium cobalt oxide, a lithium nickel cobalt aluminum oxide, a lithium nickel cobalt manganese oxide, and a combination thereof.

The generally flake-shaped polyethylene particles may have an average particle size ($D_{50}$) of about 1 μm to about 8 μm.

The ratio of a long axis length relative to a short axis length of the generally flake-shaped polyethylene particles may be about 1:1 to about 5:1.

The generally flake-shaped polyethylene particles may have a thickness of about 0.2 μm to about 4 μm.

The negative electrode functional layer may further include inorganic particles and a binder.

The generally flake-shaped polyethylene particles and the inorganic particles may have a weight ratio relative to a binder of about 80:20 to about 99:1.

The flake-shaped polyethylene particles to the inorganic particles may have a weight ratio of about 95:5 to about 10:90.

The negative electrode functional layer may have a thickness of about 1 μm to about 10 μm.

The positive active material layer may be disposed on the positive current collector.

The negative active material layer may be disposed on the negative current collector, and the negative electrode functional layer may be disposed on the negative active material layer.

The positive electrode functional layer may be disposed on the positive active material layer.

According to another aspect of the invention, a positive electrode for a rechargeable lithium battery includes a positive current collector and a positive active material layer at least partially disposed on the positive current collector, wherein the positive active material layer includes a first positive active material having at least one of a composite oxide of a metal selected from cobalt, manganese, nickel, and a combination thereof and lithium, and a second positive active material having a compound represented by Chemical Formula 1:

$$Li_aM_xFe_{1-x}PO_4 \quad \text{Chemical Formula 1}$$

wherein, in Chemical Formula 1, $0.90 \leq a \leq 1.8$, $0.5 \leq x \leq 1.0$, and M is Mn, Co, Ni, or combination thereof.

The positive active material layer may be entirely disposed on the positive current collector.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION OF THE EMBODIMENTS

Figure 1:
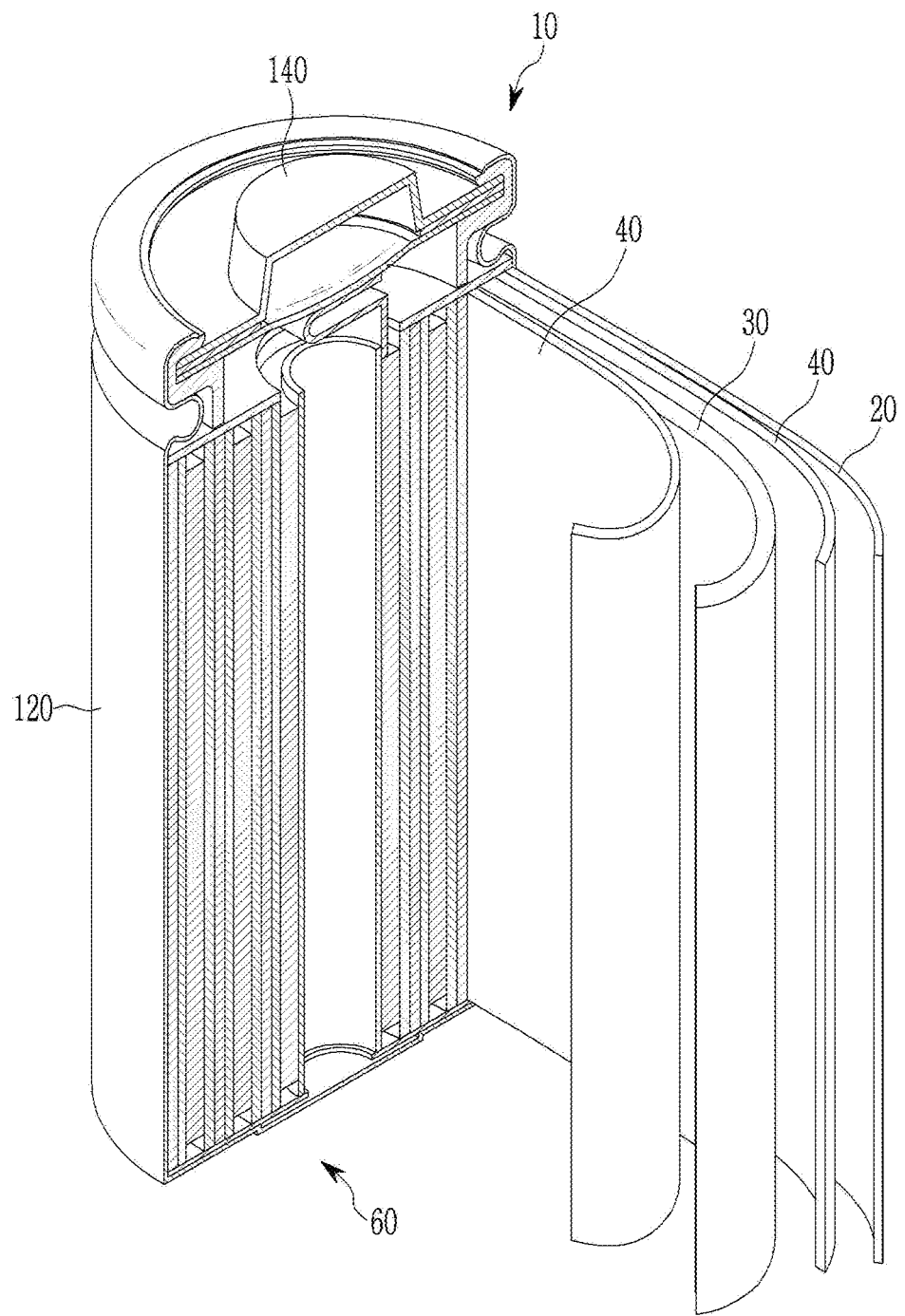
FIG. 1 is a perspective, cut-away view of an exemplary embodiment of a rechargeable lithium battery constructed according to principles of the invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As used herein, "weight percent" may be abbreviated herein as "wt %".

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

A rechargeable lithium battery may be classified into a lithium ion battery, a lithium ion polymer battery, and a lithium polymer battery depending on kinds of a separator and an electrolyte. It also may be classified as being generally cylindrical, prismatic, coin-type, pouch-type, and the like depending on its shape. In addition, it may be generally bulk type and thin film type depending on size. Structures and manufacturing methods for lithium ion batteries are well known in the art.

FIG. 1 is a perspective, cut-away view of an exemplary embodiment of a rechargeable lithium battery constructed according to principles of the invention.

As an example of a rechargeable lithium battery, a generally cylindrical rechargeable lithium battery is described hereinafter. Referring to FIG. 1, a rechargeable lithium battery 10 according to some exemplary embodiments includes a battery cell 60 having a negative electrode 20, a positive electrode 30 facing the negative electrode 20, a separator 40 disposed between the negative electrode 20 and the positive electrode 30, and an electrolyte impregnating the negative electrode 20, positive electrode 30, and separator 40, a battery case 120 containing the battery cell 60, and a sealing member 140 sealing the battery case 120.

Figure 2A:
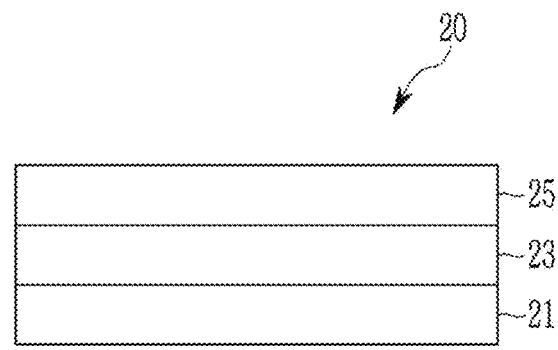
FIG. 2A is a schematic diagram of an exemplary embodiment of the negative electrode for the rechargeable lithium battery constructed according to principles of the invention.
Figure 2B:
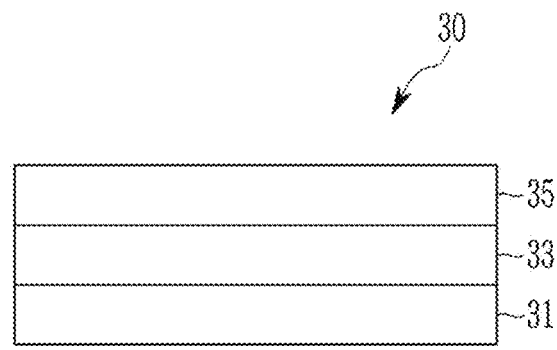
FIG. 2B is a schematic diagram of an exemplary embodiment of the positive electrode for the rechargeable lithium battery constructed according to principles of the invention.

FIG. 2A is a schematic diagram of an exemplary embodiment of the negative electrode for the rechargeable lithium battery constructed according to principles of the invention. FIG. 2B is a schematic diagram of an exemplary embodiment of the positive electrode for the rechargeable lithium battery constructed according to principles of the invention.

A rechargeable lithium battery 10 according to some exemplary embodiments includes the negative electrode 20 and a positive electrode 30. The negative electrode 20 includes a negative current collector 21, a negative active material layer 23 disposed at least partially on or on the negative current collector 21, and a negative electrode functional layer 25 disposed at least partially on or on the negative active material layer 23. In addition, the negative electrode functional layer 25 may include generally flake-shaped polyethylene particles. The positive electrode 30 includes a positive current collector 31 and a positive active material layer 33 disposed at least partially on or on the positive current collector 31, and a positive electrode functional layer 35 disposed at least partially on or on the positive active material layer 33.

The positive active material layer 33 may include a first positive active material including at least one of a composite oxide of a metal selected from cobalt, manganese, nickel, and a combination thereof and lithium. In some exemplary embodiments, the first positive active material may include at least one of a lithium cobalt oxide (LCO), a lithium nickel cobalt aluminum oxide (NCA), a lithium nickel cobalt manganese oxide (NCM), and a combination thereof.

A second positive active material including a compound represented by Chemical Formula 1.

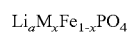 Chemical Formula 1

In Chemical Formula 1, 0.90≤a≤1.8, 0.5≤x≤1.0, and M is Mn, Co, Ni, or a combination thereof.

The second positive active material is a high power material having a high average potential and may realize high capacity at a voltage of about 3 V or higher. In other words, when the second positive active material is used together, high capacity may be realized even at a high voltage, and thus a high-capacity rechargeable battery may be realized.

For example, based on a discharge voltage of 3.4 V, while a rechargeable battery including lithium iron phosphate (LFP) as a positive active material exhibits sharp capacity degradation, the rechargeable battery including the second positive active material represented by Chemical Formula 1 may maintain high capacity. Specifically, based on 3.4 V, this rechargeable battery may exhibit about 2.2% improved capacity as compared to the rechargeable battery including LFP.

In addition, because the negative electrode 20-having the negative electrode functional layer 25 including flake-shaped polyethylene (PE) particles is also included, a shutdown function thus may be further effectively realized and thereby prevent an additional electrical/chemical reaction, and accordingly, the safety of the rechargeable battery 10 may be assured.

The second positive active material represented by Chemical Formula 1 may have an average potential of about 3.5 V to about 4.5 V. When the average potential is within this range, a rechargeable battery workable at a high voltage may be realized, and even though a discharge voltage is increased, the capacity degradation may be improved, and accordingly, a high energy density battery securing safety may be attained.

In some exemplary embodiments, the weight ratio of the first positive active material to the second positive active material may be about 97:3 to about 80:20, for example about 95:5 to about 85:15.

The amount of the first positive active material may be about 70 wt % to about 99 wt %, more specifically, about 85 wt % to about 99 wt %, about 87 wt % to about 95 wt %, or about 90 wt % to about 93 wt % based on a total weight of the positive active material layer 33.

The amount of the second positive active material may be about 1 wt % to about 15 wt %, more specifically, about 2 wt % to about 15 wt %, about 2 wt % to about 12 wt %, or about 2 wt % to about 10 wt % based on a total weight of the positive active material layer.

When the amounts of the first positive active material and the second positive active material satisfy the above range, safety may be improved without lowering capacity. The positive electrode 30 may further include the positive electrode functional layer 35 disposed on the positive active material layer 33.

For example, the first positive active material may be included in the positive active material layer 33, and the second positive active material may be included in at least one of the positive active material layer 33 and the positive electrode functional layer 35.

The first positive active material may specifically include one of $LiCoO_2$; $Li_{x1}M^1_{1-y1-z1}M^2_{y1}M^3_{z1}O_2$ ($0.9 \leq x1 \leq 1.8$, $0 \leq y1 \leq 1$, $0 \leq z1 \leq 1$, $0 \leq y1+z1 \leq 1$, and $M^1$, $M^2$, and $M^3$ are independently a metal of Ni, Co, Mn, Al, Sr, Mg. or La); and a combination thereof. For example, the first positive active material may include $LiCoO_2$, but is not limited thereto. For example, $M^1$ may be Ni, and $M^2$ and $M^3$ may each, independently, be a metal such as Co, Mn, Al, Sr, Mg, or La. More specifically, $M^1$ may be Ni, $M^2$ may be Co, and $M^3$ may be Mn or Al, but are not limited thereto.

In some exemplary embodiments, the second positive active material may be selected from $LiMn_{0.7}Fe_{0.3}PO_4$, $LiMnPO_4$, and a combination thereof, but is not limited thereto. The positive active material layer 33 may optionally further include a positive electrode conductive material and a positive electrode binder. The amounts of the positive electrode conductive material and the positive electrode binder may be about 1 wt % to about 5 wt % based on a total weight of the positive active material layer 33, respectively.

The positive electrode conductive material is used to impart conductivity to the positive electrode 30, and may be used as long as it is an electron conductive material without causing chemical change in the battery. Examples of the conductive material may include a carbon-based material such as natural graphite, artificial graphite, carbon black, acetylene black, a carbon black sold under the trade designation KETJENBLACK, a carbon fiber, and the like; a metal-based material of a metal powder or a metal fiber including copper, nickel, aluminum, silver, and the like; a conductive polymer such as a polyphenylene derivative; or a mixture thereof.

The positive electrode binder adheres positively to the positive active material particles, and also serves to adhere the positive active materials to the current collector as well. Examples thereof may be a polyvinyl alcohol, a carboxylmethyl cellulose, a hydroxypropyl cellulose, a diacetyl cellulose, a polyvinyl chloride, a carboxylated polyvinylchloride, a polyvinyl fluoride, an ethylene oxide-containing polymer, a polyvinylpyrrolidone, a polyurethane, a polytetrafluoroethylene, a polyvinylidene fluoride, a polyethylene (PE), a polypropylene (PP), a styrene-butadiene rubber, an acrylated styrene-butadiene rubber, an epoxy resin, a nylon, and the like, but are not limited thereto.

The positive current collector may include aluminum, nickel, and the like, but is not limited thereto. The electrolyte includes a non-aqueous organic solvent and a lithium salt. The non-aqueous organic solvent serves as a medium for transporting ions taking part in the electrochemical reaction of a battery.

The non-aqueous organic solvent may include at least one of a carbonate-based, an ester-based, an ether-based, a ketone-based, an alcohol-based, or an aprotic solvent. The carbonate-based solvent may include a dimethyl carbonate (DMC), a diethyl carbonate (DEC), a dipropyl carbonate (DPC), a methylpropyl carbonate (MPC), an ethylpropyl carbonate (EPC), a methylethyl carbonate (MEC), an ethylene carbonate (EC), a propylene carbonate (PC), a butylene carbonate (BC), and the like and the ester-based solvent may include a methyl acetate, an ethyl acetate, an n-propyl acetate, a dimethylacetate, a methylpropionate, an ethylpropionate, a γ-butyrolactone, a decanolide, a valerolactone, a mevalonolactone, a caprolactone, and the like. The ether-based solvent may include a dibutyl ether, a tetraglyme, a diglyme, a dimethoxyethane, a 2-methyltetrahydrofuran, tetrahydrofuran, and the like and the ketone-based solvent may include a cyclohexanone, and the like. The alcohol-based solvent include an ethyl alcohol, an isopropyl alcohol, and so on, and examples of the aprotic solvent include one or more nitriles such as R—CN (wherein R is a C2 to C20 linear, branched, or cyclic hydrocarbon group that may include a double bond, an aromatic ring, or an ether bond), amides such as a dimethylformamide, one or more dioxolanes such as 1,3-dioxolane, one or more sulfolanes, and so on.

The non-aqueous organic solvent may be used alone or in a mixture of two or more solvents. When the organic solvent is used in a mixture, the mixture ratio can be controlled in accordance with a desirable battery performance.

The carbonate-based solvent may include a mixture of a cyclic carbonate and a chain carbonate. The cyclic carbonate and the chain carbonate are mixed together at a volume ratio of about 1:1 to about 1 9, and when the mixture is used as an electrolyte, the electrolyte performance may be enhanced.

The non-aqueous organic solvent of some exemplary embodiments may further include an aromatic hydrocarbon-based organic solvent in addition to the carbonate-based solvent. In this case, the carbonate-based solvent and the aromatic hydrocarbon-based organic solvent may be mixed in a volume ratio of about 1:1 to about 30:1.

As the aromatic hydrocarbon-based organic solvent, an aromatic hydrocarbon-based compound of Chemical Formula 2 may be used.

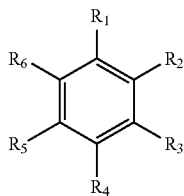

Chemical Formula 2

In Chemical Formula 2, $R_1$ to $R_6$ are the same or different and are selected from hydrogen, a halogen, a C1 to C10 alkyl group, a haloalkyl group, and a combination thereof.

Specific examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The non-aqueous electrolyte may further include vinylene carbonate or an ethylene carbonate-based compound of Chemical Formula 3 in order to improve cycle-life of a battery.

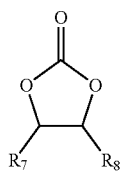

Chemical Formula 3

In Chemical Formula 3, $R_7$ and $R_8$ may be the same or different and may be hydrogen, a halogen group, a cyano group (CN), a nitro group ($NO_2$), or a fluorinated C1 to C5 alkyl group, wherein at least one of $R_7$ and $R_8$ is selected from a halogen group, a cyano group (CN), a nitro group ($NO_2$), and a fluorinated C1 to C5 alkyl group, provided that $R_7$ and $R_8$ are not both hydrogen.

Examples of the ethylene carbonate-based compound may include difluoro ethylenecarbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the cycle-life improvement additive may be used within an appropriate range.

The lithium salt dissolved in an organic solvent supplies a battery with lithium ions, basically operates the rechargeable lithium battery, and improves transportation of the lithium ions between a positive electrode and a negative electrode. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)$ ($C_yF_{2y+1}SO_2$) wherein, x and y are, independently, natural numbers, LiCl, LiI, and $LiB(C_2O_4)_2$ (lithium bis(oxalato) borate, LiBOB). A concentration of the lithium salt may range from about 0.1 M to about 2.0 M in the non-aqueous organic solvent. When the lithium salt is included at the above concentration range, an electrolyte may have excellent performance and lithium ion mobility due to optimal electrolyte conductivity and viscosity.

The polyethylene is generally HDPE (high density polyethylene, density: about 0.94 g/cc to about 0.965 g/cc), MDPE (medium density polyethylene, density: about 0.925 g/cc to about 0.94 g/cc), LDPE (low density polyethylene, density: about 0.91 g/cc to about 0.925 g/cc), VLDPE (very low density polyethylene, density: about 0.85 g/cc to about 0.91 g/cc), and the like.

The generally flake-shaped polyethylene particles may be used alone or in combination of two or more polyethylene polymers such as HDPE, MDPE, or LDPE. The average particle size ($D_{50}$) of the flake-shaped polyethylene particles included in the negative electrode functional layer 25 disposed on the negative active material layer 23 may be about 1 μm to about 8 μm, and specifically about 2 μm to about 6 μm.

As used herein, the average particle size ($D_{50}$) may be measured by a well-known method for a person of an ordinary skill in the art, for example, as a particle size analyzer, or from transmission electron microscope (TEM) or SEM photographs. Alternatively, a dynamic light-scattering measurement device is used to perform a data analysis, and the number of particles is counted for each particle size range. From this, the $D_{50}$ value may be easily obtained through a calculation.

Specifically, the particle size of a flake-shaped polyethylene particle may be determined by a dynamic light-scattering measurement method. Specifically, the size may be measured by LS13 320 series most common laser diffraction measuring instrument. For example, about 5 wt % of the flake-shaped polyethylene is diluted with a main solvent, and then the mixture is dispersed with an ultrasonicator for about 1 minute. Then the particle size of a flake-shaped polyethylene particle may be determined by a common measuring method.

More specifically, the particle size of a flake-shaped polyethylene particle may be determined by a dynamic light-scattering measurement method. Specifically, the size may be measured by ISO 13320 through the analysis of the light-scattering properties of the particles. For the non-spherical particles, a size distribution is reported, where the predicted scattering pattern for the volumetric sum of spherical particles matches the measured scattering pattern.

On the other hand, the ratio of the long axis length relative to the short axis length of the generally flake-shaped polyethylene particles may be about 1:1 to about 5:1, specifically about 1.1:1 to about 4.5:1, for example about 1.2:1 to about 3.5:1. In addition, the thickness of the generally flake-shaped polyethylene particles may be about 0.2 μm to about 4 μm, specifically, about 0.3 μm to about 2.5 μm, for example may be about 0.3 μm to about 1.5 μm.

Figure 4:
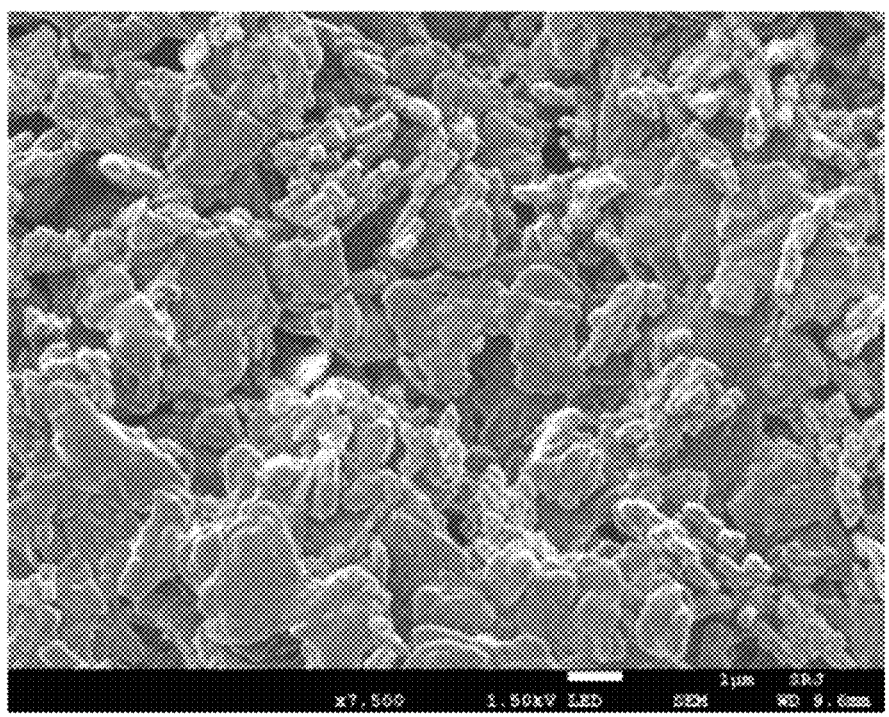
FIG. 4 is scanning electron microscope (SEM) photograph of an exemplary embodiment of polyethylene particles of a negative functional layer.
Figure 5:
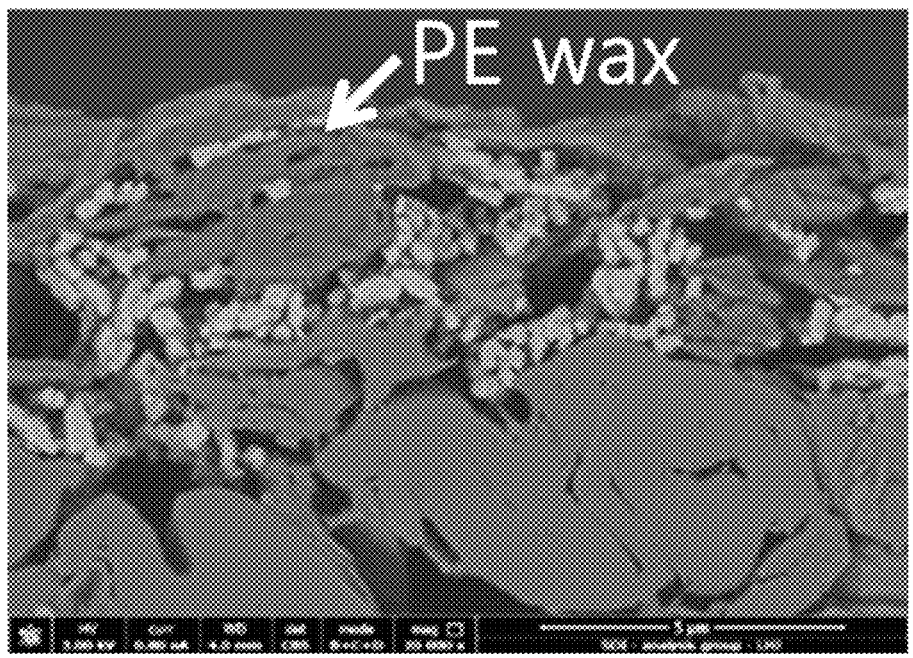
FIG. 5 is a SEM photograph of an exemplary embodiment of a negative electrode composition.

FIG. 4 is scanning electron microscope (SEM) photograph of an exemplary embodiment of polyethylene particles of a negative functional layer. FIG. 5 is a SEM photograph of an exemplary embodiment of a negative electrode composition.

The polyethylene particles according to the exemplary embodiments are generally flake-shaped, as seen in FIG. 4, and the average particle size may be defined as ($D_{50}$) described above. When the size and thickness of the generally flake-shaped polyethylene particles are within the above range, ion channels may be effectively closed even in a small amount. When the negative electrode functional layer 25 including the generally flake-shaped polyethylene particles is provided, the reaction rate may be increased according to temperature under the same reaction conditions, compared with the case of including generally spherical polyethylene particles, thereby improving stability of the rechargeable lithium battery 10. In the case before the generally flake-shaped polyethylene particles melt, the area covering pores is thinner and wider than that of the generally spherical shaped polyethylene particles. When the polyethylene particles are melted at a predetermined temperature or higher to close ion channels, the reaction rate is faster because the generally flake-shaped polyethylene particles have a larger surface area than that of the electrode plate closed by the melted generally spherical polyethylene particles.

That is, the polyethylene particles included in the negative electrode functional layer 25 during thermal runaway of the battery melt to close the ion channels, thereby limiting the movement of the ions to implement a shut-down function to prevent additional electrochemical reactions, which could result in an explosion. For example, as shown in FIG. 4, because the flake-shaped polyethylene particles according to some exemplary embodiments are disposed in a thin and wide shape on the pores in a composition for the negative electrode functional layer 25, the flake-shaped polyethylene particles melt more rapidly during thermal runaway due to thermal/physical impact, thereby suppressing passage of ions.

The negative electrode functional layer 25 may further include inorganic particles and a binder. The weight ratio of the flake-shaped polyethylene particles and the inorganic particles to an amount of the binder may be about 80:20 to about 99:1, and specifically, about 85:15 to about 97:3. The weight ratio of the flake-shaped polyethylene particles to the inorganic particles may be about 95:5 to about 10:90, and specifically about 30:70 to about 70:30. When the amounts of the generally flake-shaped polyethylene particles and the inorganic particles are in the above range, cycle-life characteristics and output characteristics of the battery 10 may be improved.

The inorganic particles may include, for example, $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, a boehmite, or a combination thereof, but are not limited thereto. Organic particles may include an acrylic compound, an imide compound, an amide compound, or a combination thereof and optionally include the inorganic particles, but are not limited thereto.

The inorganic particles may be generally spherical, flake-shaped, cubic, or amorphous. The inorganic particles may have an average particle diameter of about 1 nm to about 2500 nm, for example about 100 nm to about 2000 nm, about 200 nm to about 1000 nm, or about 300 nm to about 800 nm. The average particle diameter of the inorganic particle may be an average particle size ($D_{50}$) at a volume ratio of 50% in a cumulative size-distribution curve. The negative electrode functional layer 25 may have a thickness of about 1 μm to about 10 μm, and specifically about 3 μm to about 10 μm. In addition, the ratio of the thickness of the negative active material layer 23 to the thickness of the negative electrode functional layer 25 may be about 50:1 to about 10:1, and specifically about 30:1 to about 10:1.

When the thickness of the negative electrode functional layer 25 is within the above range, the thermal stability may be significantly improved while maintaining excellent cycle-life characteristics. Particularly, when the ratio of the thickness of the negative electrode functional layer 25 is included in the above range, thermal safety may be improved while minimizing the decrease in energy density.

The negative current collector 21 may include a copper foil, a nickel foil, a stainless steel foil, a titanium foil, a nickel foam, a copper foam, a polymer substrate coated with a conductive metal, or a combination thereof.

The negative active material may include a material that reversibly intercalates/deintercalates lithium ions, a lithium metal, a lithium metal alloy, a material capable of doping/dedoping lithium, or a transition metal oxide.

Examples of the material capable of reversibly intercalating/deintercalating the lithium ions may include a carbonaceous material, i.e., a carbon-based negative active material generally used in a rechargeable lithium battery. Examples of the carbon-based negative active material may be a crystalline carbon, an amorphous carbon, or a combination thereof. The crystalline carbon may be a graphite such as a generally non-shaped, a generally sheet-shaped, a generally flake-shaped, a generally spherical shape, or a generally fiber shaped natural graphite or an artificial graphite, and the amorphous carbon may be a soft carbon, a hard carbon, a mesophase pitch carbonization product, a fired coke, and the like. The lithium metal alloy includes an alloy of lithium and a metal selected from Na, K, Rb, Cs, Fr, Be, Mg, Ca, Sr, Si, Sb, Pb, In, Zn, Ba, Ra, Ge, Al, and Sn.

The material capable of doping/dedoping lithium may be a silicon-based or a tin-based material, for example, Si, $SiO_x$ ($0<x<2$), a Si-Q alloy (wherein Q is an element selected from an alkali metal, an alkaline-earth metal, a Group 13 element, a Group 14 element, a Group 15 element, a Group 16 element, a transition metal, a rare earth element, and a combination thereof, but not Si), a Si-carbon composite, Sn, $SnO_2$, a Sn—R alloy (wherein R is an element selected from an alkali metal, an alkaline-earth metal, a Group 13 element, a Group 14 element, a Group 15 element, a Group 16 element, a transition metal, a rare earth element, and a combination thereof, but not Sn), a Sn-carbon composite and the like. At least one of these materials may be mixed with $SiO_2$. The elements Q and R may be selected, independently from one another, from Mg, Ca, Sr, Ba, Ra, Sc, Y, Ti, Zr, Hf, Rf, V, Nb, Ta, Db, Cr, Mo, W, Sg, Tc, Re, Bh, Fe, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and a combination thereof. The transition metal oxide may include a lithium titanium oxide.

In the negative active material layer 23, the amount of the negative active material may be about 95 wt % to about 99 wt % based on a total weight of the negative active material layer 23. The negative active material layer 23 may optionally further include a negative electrode conductive material and a negative electrode binder.

The amount of the negative electrode conductive material and negative electrode binder may each be, independently, about 1 wt % to about 5 wt % based on a total weight of the negative active material layer 23.

The negative electrode conductive material is used to impart conductivity to the negative electrode 20, and types of the negative electrode conductive material is the same as types of the positive electrode conductive material described above.

The negative electrode binder improves binding properties of negative active material particles with one another and with the negative current collector 21. The negative electrode binder may be a non-water-soluble binder, a water-soluble binder, an amphiphilic binder (water-soluble/non-water-soluble binder), or a combination thereof.

The non-water-soluble binder may be a polyvinyl chloride, a carboxylated polyvinyl chloride, a polyvinyl fluoride, an ethylene oxide-containing polymer, a polyvinylpyrrolidone, a polyurethane, a polytetrafluoroethylene, a polyvinylidene fluoride, a polyethylene, a polypropylene, a polyamideimide, a polyimide, or a combination thereof.

The water-soluble binder may be a styrene-butadiene rubber, an acrylated styrene-butadiene rubber, a polyvinyl alcohol, a sodium polyacrylate, a copolymer of propylene and a C2 to C8 olefin, a copolymer of (meth)acrylic acid and (meth)acrylic acid alkyl ester, or a combination thereof.

The amphiphilic binder may be an acrylated styrene-based rubber. If the water-soluble binder is used as a negative electrode binder, a cellulose-based compound may be further used to provide viscosity as a thickener. The cellulose-based compound includes one or more of a carboxylmethyl cellulose, a hydroxypropylmethyl cellulose, a methyl cellulose, or an alkali metal salt thereof. The one or more alkali metals may be Na, K, or Li. The thickener may be included in an amount of about 0.1 parts by weight to about 3 parts by weight based on 100 parts by weight of the negative active material.

The rechargeable lithium battery 10 according to some exemplary embodiments simultaneously includes the negative electrode functional layer 25 including the flake-shaped polyethylene particles on the negative electrode 20 and the positive active material layer 33 including the positive active material of a layered structure including at least one composite oxide with a metal selected from cobalt, manganese, nickel, and a combination thereof and lithium and a lithium manganese iron phosphate (LMFP)-based positive active material and thus may minimize the capacity degradation and simultaneously, decrease the heat-increasing rate by thermal/physical impacts, exhibiting an effective shut-down.

The separator 40 may be disposed between the negative electrode 20 and the positive electrode 30 as described above. The separator 40 may be, for example, selected from a glass fiber, a polyester, a polyethylene, a polypropylene, a polytetrafluoroethylene, or a combination thereof. It may be in the form of a non-woven fabric or a woven fabric. For example, in a rechargeable lithium battery, a polyolefin-based polymer separator such as a polyethylene and a polypropylene may be used. In order to ensure the heat resistance or mechanical strength, a coated separator including a ceramic component or a polymer material may be used. Optionally, it may have a mono-layered or multi-layered structure.

Manufacture of Rechargeable Lithium Battery Cells

EXAMPLE 1

Amounts of 95 wt % of a positive active material prepared by mixing $LiCoO_2$ and $LiMn_{0.7}Fe_{0.3}PO_4$ in a weight ratio of 9:1 as first and second positive active materials, 3 wt % of a polyvinylidene fluoride binder, and 2 wt % of a KETJEN black conductive material were mixed in an N-methylpyrrolidone solvent to prepare positive active material slurry. The positive active material slurry was coated on both surfaces of an aluminum current collector and then, dried and compressed to manufacture a positive electrode having a positive active material layer.

Amounts of 98 wt % of graphite, 0.8 wt % of carboxylmethyl cellulose, and 1.2 wt % of a styrene-butadiene rubber were mixed in pure water to prepare negative active material slurry. The negative active material slurry was coated on both surfaces of a copper current collector and then, dried and compressed to manufacture a negative electrode having a negative active material layer.

Amounts of 48 wt % of 2 μm generally flake-shaped PE particles (a long axis length/a short axis length=about 2:1, a thickness=about 0.6 μm), 47 wt % of alumina (an average particle diameter ($D_{50}$)=0.7 μm), and 5 wt % of an acrylated styrene-based rubber binder were mixed in an alcohol-based solvent to prepare PE/alumina slurry.

The PE/alumina slurry was coated on both surfaces of the negative electrode and then, dried and compressed to manufacture a negative electrode having a coating layer including the generally flake-shaped PE particles.

The positive electrode, a separator of a PE/PP multi-layer, and the negative electrode having the coating layer including the generally flake-shaped PE particles were sequentially stacked to form an electrode assembly having a structure as shown in FIG. 1, and an electrolyte (1.0 M $LiPF_6$ in EC/DEC=50:50 volume/volume) was injected thereinto to manufacture a rechargeable battery cell.

EXAMPLE 2

A rechargeable battery cell was manufactured according to the same method as Example 1 except that NCA ($Li_{1.02}Ni_{0.60}Co_{0.20}Al_{0.20}O_2$) was used instead of $LiCoO_2$.

EXAMPLE 3

A rechargeable battery cell was manufactured according to the same method as Example 1 except that NCM ($LiNi_{1/3}Co_{1/3}Mn_{1/3}O_2$) was used instead of $LiCoO_2$.

EXAMPLE 4

A rechargeable battery cell was manufactured according to the same method as Example 1 except that a positive active material prepared by mixing $LiCoO_2$ and $LiMnPO_4$ in a weight ratio of 9:1 as first and second positive active materials was used instead of the mixed positive active material of $LiCoO_2/LiMn_{0.7}Fe_{0.3}PO_4$ in Example 1.

COMPARATIVE EXAMPLE 1

A rechargeable battery cell was manufactured according to the same method as Example 1 except that LiCoO2 alone was used instead of the mixed positive active material of LiCoO2/LiMn0.7Fe0.3PO4 in Example 1.

COMPARATIVE EXAMPLE 2

A rechargeable battery cell was manufactured according to the same method as Example 1 except that a positive active material prepared by mixing $LiCoO_2$ and $LiFePO_4$ in a weight ratio of 9:1 was used instead of the mixed positive active material $LiCoO_2/LiMn_{0.7}Fe_{0.3}PO_4$ in Example 1.

EVALUATION EXAMPLES

1. Measurement of Discharge Capacity Retention Depending on Discharge Voltage

Figure 3:
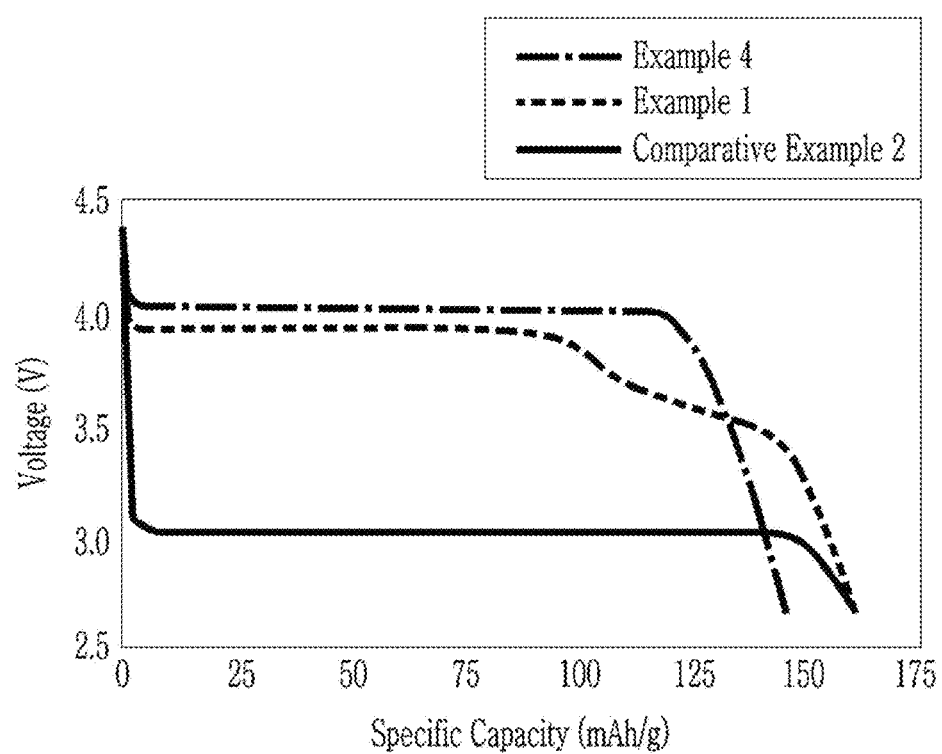
FIG. 3 is a graphical depiction illustrating voltage-capacity characteristics versus specific capacity of exemplary embodiments of rechargeable lithium battery cells according to Examples 1 and 4, and a comparative embodiment of a rechargeable lithium cell according to Comparative Example 2.

The rechargeable battery cells of Examples 1 and 4 and Comparative Examples 1 and 2 were measured with respect to discharge capacity retention depending on a discharge voltage, and the results are shown in Table 1 and FIG. 3.

2. Evaluation of Penetration Safety

A penetration test was performed with respect to the rechargeable battery cells of Examples 1 to 4 and Comparative Examples 1 and 2 by using a pin having a diameter of 2.5 mm at 5 mm/s under a voltage of 4.3 V, and the results are shown in Table 1.

Evaluation Criteria
L1: No influence on appearance
L2: Scratches on appearance but no leakage
L3: Leakage
L4: Fire
L5: Explosion 3. Evaluation of Dropping Stability The rechargeable battery cells of Examples 1 to 4 and Comparative Examples 1 and 2 were 18 times dropped from 1.8 m high to a concrete slab floor at 20° C.±5° C. The battery cells were placed to have impacts applied to several parts, and then, the test was respectively performed three times with respect to a top end/a bottom end/a top right angle/a bottom right angle/a top left angle/a bottom left angle, and the results are shown in Table 1.

4. Evaluation of Collision Safety

The rechargeable battery cells of Examples 1 to 4 and Comparative Examples 1 and 2 were charged up to a maximum voltage at 0.5 C under a cut-off of 0.05 C and then, aged for 24 hours and then, evaluated as follows.

Full-charged cells was put on a steel sheet (a thickness≥5 cm).

A round bar (a diameter: 15 mm) was placed respectively in the center of the specimens, wherein the round bar was placed in a vertical direction to electrodes.

A cylindrical cell was evaluated by placing the round bar in the center of battery cells like a seesaw shape.

A cylindrical weight of 9 kg was freely dropped from 610 mm high into the bar, and the results is are examined and then, shown in Table 1.

TABLE 1

| | Discharge voltage(V) | Example 1 | Example 2 | Example 3 | Example 4 | Comparative Example 1 | Comparative Example 2 |
|---|---|---|---|---|---|---|---|
| | | Discharge capacity retention (%) | | | | | |
| Evaluation of discharge capacity | 2.75 | 100 | — | — | 100 | 100 | 100 |
| | 3.00 | 98.6 | — | — | 98.4 | 99.9 | 98.1 |
| | 3.40 | 97.1 | — | — | 97.4 | 98.1 | 94.9 |
| Evaluation of safety | Penetration | L2 | L2 | L2 | L2 | L4 | L2 |
| | Dropping | L2 | L2 | L2 | L2 | L4 | L2 |
| | Collision | L2 | L2 | L2 | L2 | L4 | L2 |

FIG. 3 is a graphical depiction illustrating voltage-capacity characteristics versus specific capacity of exemplary embodiments of rechargeable lithium battery cells according to Examples 1 and 4, and a comparative embodiment of a rechargeable lithium cell according to Comparative Example 2.

Referring to FIG. 3 and Table 1, in the discharge capacity evaluation, the rechargeable battery cell including LFP instead of the compound represented by Chemical Formula 1 as a second positive active material according to Comparative Example 2 exhibited capacity degradation, as a voltage was increased.

On the other hand, the rechargeable battery cell including no second positive active material according to Comparative Example 1 exhibited stability degradation such as an ignition or a leakage in the safety evaluation.

In summary, referring to FIG. 3 and Table 1, a rechargeable battery cell according to exemplary embodiments included the first positive active material and the second positive active material represented by Chemical Formula 1 and thus significantly and unexpectedly realized capacity at a high voltage and simultaneously showed better safety characteristics, But the battery cell including the first positive active material alone without the second positive active material exhibited safety degradation, and the battery cell including the LFP positive active material as the second positive active material exhibited capacity degradation.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A rechargeable lithium battery, comprising
a positive electrode having a positive current collector and a positive active material layer at least partially disposed on the positive current collector, wherein the positive active material layer comprises a first positive active material comprising at least one of a composite oxide of a metal selected from cobalt, manganese, nickel, and a combination thereof and lithium, and a second positive active material comprising a compound represented by Chemical Formula 1:

$$Li_aM_xFe_{1-x}PO_4 \qquad \text{Chemical Formula 1}$$

wherein, in Chemical Formula 1, $0.90 \leq a \leq 1.8$, $0.5 \leq x \leq 1.0$, and M is Mn, Co, Ni, or combination thereof; and
a negative electrode having a negative current collector, a negative active material layer at least partially disposed on the negative current collector, and a negative electrode functional layer comprising generally flake-shaped polyethylene particles at least partially disposed on the negative active material layer,
wherein the generally flake-shaped polyethylene particles have a thickness of about 0.2 μm to about 4 μm, and the flake-shaped polyethylene particles do not include spherical polyethylene particles.

2. The rechargeable lithium battery of claim 1, wherein the second positive active material has an average potential of about 3.5 V to about 4.5 V.

3. The rechargeable lithium battery of claim 1, wherein the first positive active material and the second positive active material have a weight ratio of about 97:3 to about 80:20.

4. The rechargeable lithium battery of claim 1, wherein the first positive active material is provided in an amount of about 70 wt % to about 99 wt % based on a total weight of the positive active material layer.

5. The rechargeable lithium battery of claim 1, wherein the second positive active material is provided in an amount of about 1 wt % to about 15 wt % based on a total weight of the positive active material layer.

6. The rechargeable lithium battery of claim 1, wherein the positive electrode further comprises a positive electrode functional layer at least partially disposed on the positive active material layer.

7. The rechargeable lithium battery of claim 6, wherein
the first positive active material is included in the positive active material layer, and
the second positive active material is included in at least one of the positive active material layer and the positive electrode functional layer.

8. The rechargeable lithium battery of claim 1, wherein the first positive active material comprises at least one of a lithium cobalt oxide, a lithium nickel cobalt aluminum oxide, a lithium nickel cobalt manganese oxide, and a combination thereof.

9. The rechargeable lithium battery of claim 1, wherein the generally flake-shaped polyethylene particles have an average particle size ($D_{50}$) of about 1 μm to about 8 μm.

10. The rechargeable lithium battery of claim 1, wherein a ratio of a long axis length relative to a short axis length of the generally flake-shaped polyethylene particles is about 1:1 to about 5:1.

11. The rechargeable lithium battery of claim 1, wherein the negative electrode functional layer further comprises inorganic particles and a binder.

12. The rechargeable lithium battery of claim 11, wherein the generally flake-shaped polyethylene particles and the inorganic particles have a weight ratio relative to a binder of about 80:20 to about 99:1.

13. The rechargeable lithium battery of claim 11, wherein the flake-shaped polyethylene particles to the inorganic particles have a weight ratio of about 95:5 to about 10:90.

14. The rechargeable lithium battery of claim 1, wherein the negative electrode functional layer has a thickness of about 1 μm to about 10 μm.

15. The rechargeable lithium battery of claim 1, wherein the positive active material layer is disposed on the positive current collector.

16. The rechargeable lithium battery of claim 15, wherein the negative active material layer is disposed on the negative current collector, and the negative electrode functional layer is disposed on the negative active material layer.

17. The rechargeable lithium battery of claim 1, wherein a positive electrode functional layer is disposed on the positive active material layer.

* * * * *